US008123647B2

(12) United States Patent
Wenthen

(10) Patent No.: US 8,123,647 B2

(45) Date of Patent: Feb. 28, 2012

(54) DUAL CLUTCH MULTI-SPEED TRANSAXLE

(75) Inventor: David W. Wenthen, Syracuse, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 435 days.

(21) Appl. No.: 12/491,376

(22) Filed: Jun. 25, 2009

(65) Prior Publication Data

US 2010/0004088 A1 Jan. 7, 2010

Related U.S. Application Data

(60) Provisional application No. 61/077,233, filed on Jul. 1, 2008.

(51) Int. Cl.
*F16H 37/02* (2006.01)

(52) U.S. Cl. ........................................................ 475/218

(58) Field of Classification Search ........................ None
See application file for complete search history.

(56) References Cited

U.S. PATENT DOCUMENTS 3,673,890 A * 7/1972 Crooks ........................ 475/207
4,200,006 A * 4/1980 Ehrlinger et al. ............ 475/219
5,129,871 A 7/1992 Sandel et al.
5,261,861 A 11/1993 Lemieux
5,261,862 A 11/1993 Pierce
5,503,605 A 4/1996 Beim
5,593,357 A 1/1997 Justice et al.
5,704,247 A 1/1998 Ahluwalia et al.
5,743,141 A 4/1998 Forsyth
5,823,909 A 10/1998 Beim et al.
6,023,987 A 2/2000 Forsyth
6,074,321 A 6/2000 Maeda et al.
6,422,103 B1 7/2002 Forsyth
6,427,550 B1 8/2002 Bowen
6,499,370 B2 12/2002 Bowen
6,893,373 B2 * 5/2005 Kawamoto et al. ........... 475/302
7,044,014 B2 5/2006 Janson et al.
7,077,025 B2 7/2006 Janson et al.
7,163,483 B2 * 1/2007 Haka ............................ 475/212
7,272,986 B2 9/2007 Janson
7,311,630 B2 * 12/2007 Borgerson .................... 475/215
7,695,390 B2 * 4/2010 Phillips ......................... 475/218
7,824,294 B2 * 11/2010 Van Druten et al. .......... 475/207
2003/0148847 A1 8/2003 Kawamoto
2007/0131046 A1 6/2007 Borgerson
2008/0070742 A1 3/2008 Phillips

FOREIGN PATENT DOCUMENTS

EP 1 469 229 10/2004
WO WO2007/147800 12/2007

* cited by examiner

*Primary Examiner* — Dirk Wright

(74) *Attorney, Agent, or Firm* — Harness Dickey & Pierce

(57) ABSTRACT

A transaxle transfers torque to first and second axle shafts. The transaxle includes a main shaft, a planetary gearset, a first clutch transferring torque between the main shaft and a first member of the planetary gearset and a second clutch transferring torque between the main shaft and a second member of the planetary gearset. An input shaft is fixed for rotation with the first member of the planetary gearset. A countershaft is selectively driven by first, second, third and fourth speed gearsets associated with the input shaft. A final drive unit provides multiplied torque to a differential assembly adapted to drive the first and second axle shafts. Actuation of the first and second clutches selectively provides first through eighth discrete forward drive ratios such that each of the first, second, third and fourth speed gearsets transfers torque during provision of two of the first through eighth forward drive ratios.

14 Claims, 18 Drawing Sheets

210
212
234
242
244
246
232
236
248
238
256
258
270
268
262
276
282
250
240
220
222
264
278
252
214
346
348
350
334
336
226
332
338
340
337
342
339
344
330
320
352
260
224
266
254
272
280
300
298
228
230
316
314
312
311
324
322
302
304
301
308
306
310

210
212
234
242
244
246
232
248
236
238
256
258
268
270
262
264
276
282
250
252
278
220
222
240
214
346
348
350
334
336
226
332
338
340
337
342
339
344
330
320
352
260
224
266
272
280
322
324
254
300
298
228
230
316
314
312
311
302
304
301
308
306
310

210
212
234
242
244
246
232
248
236
238
240
214
256
258
220
222
268
270
262
264
276
282
278
250
252
254
346
348
350
334
336
226
332
338
340
337
342
339
344
330
320
352
260
266
272
280
324
322
298
228
300
230
316
314
312
311
302
304
301
308
306
310

DUAL CLUTCH MULTI-SPEED TRANSAXLE

CROSS-REFERENCE TO RELATED APPLICATIONS

This application claims the benefit of U.S. Provisional Application No. 61/077,233, filed on Jul. 1, 2008. The entire disclosure of the above application is incorporated herein by reference.

BACKGROUND

The present disclosure generally relates to power transmission devices for automotive vehicles. More particularly, a dual clutch multi-speed transaxle is disclosed.

A number of dual clutch transmissions have been designed to transfer power from an engine to a driveline. Some of these transmissions include concentric input shafts. Based on the arrangement of the input shafts, speed gears and various clutch components, odd numbered speed gears such as first, third and fifth may be connected to a first input shaft. A second input shaft is connected to the even numbered speed gears such as second, fourth, sixth and possibly reverse gear.

Such dual clutch transmissions may include spaced apart speed gearsets each having two or more meshed gears for each forward drive ratio that is provided. Accordingly, a transmission having eight forward drive ratios and one reverse drive ratio is equipped with eight speed gearsets used in combination with at least one countershaft and at least one reverse gear. The resulting transmission may be relatively long and costly to manufacture. The weight of this transmission may also be greater than desired.

SUMMARY

The present disclosure provides a transaxle for transferring torque to first and second axle shafts. The transaxle includes a main shaft, a planetary gearset, a first clutch to transfer torque between the main shaft and a first member of the planetary gearset and a second clutch to transfer torque between the main shaft and a second member of the planetary gearset. An input shaft is fixed for rotation with the first member of the planetary gearset. A countershaft is selectively driven by first, second, third and fourth speed gearsets associated with the input shaft. A final drive unit provides multiplied torque to a differential assembly adapted to drive the first and second axle shafts. Actuation of the first and second clutches selectively provides first through eighth discrete forward drive ratios such that each of the first, second, third and fourth speed gearsets transfers torque during provision of two of the first through eighth forward drive ratios.

Additionally, a transaxle includes a main shaft, a first input shaft and a second input shaft. A first clutch drivingly couples the main shaft to the first input shaft. A second clutch drivingly couples the main shaft to the second input shaft. First and third drive gears are driven by the first input shaft. Second and fourth drive gears are driven by the second input shaft. First, second, third and fourth driven gears are supported on a countershaft. The first, second, third and fourth drive gears are in meshed engagement with the corresponding first, second, third and fourth driven gears. A third clutch transfers torque between a first member of a planetary gearset and the countershaft. A fourth clutch transfers torque between a second member of the planetary gearset and the countershaft. Eight distinct forward drive ratios are provided between the main shaft and the countershaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
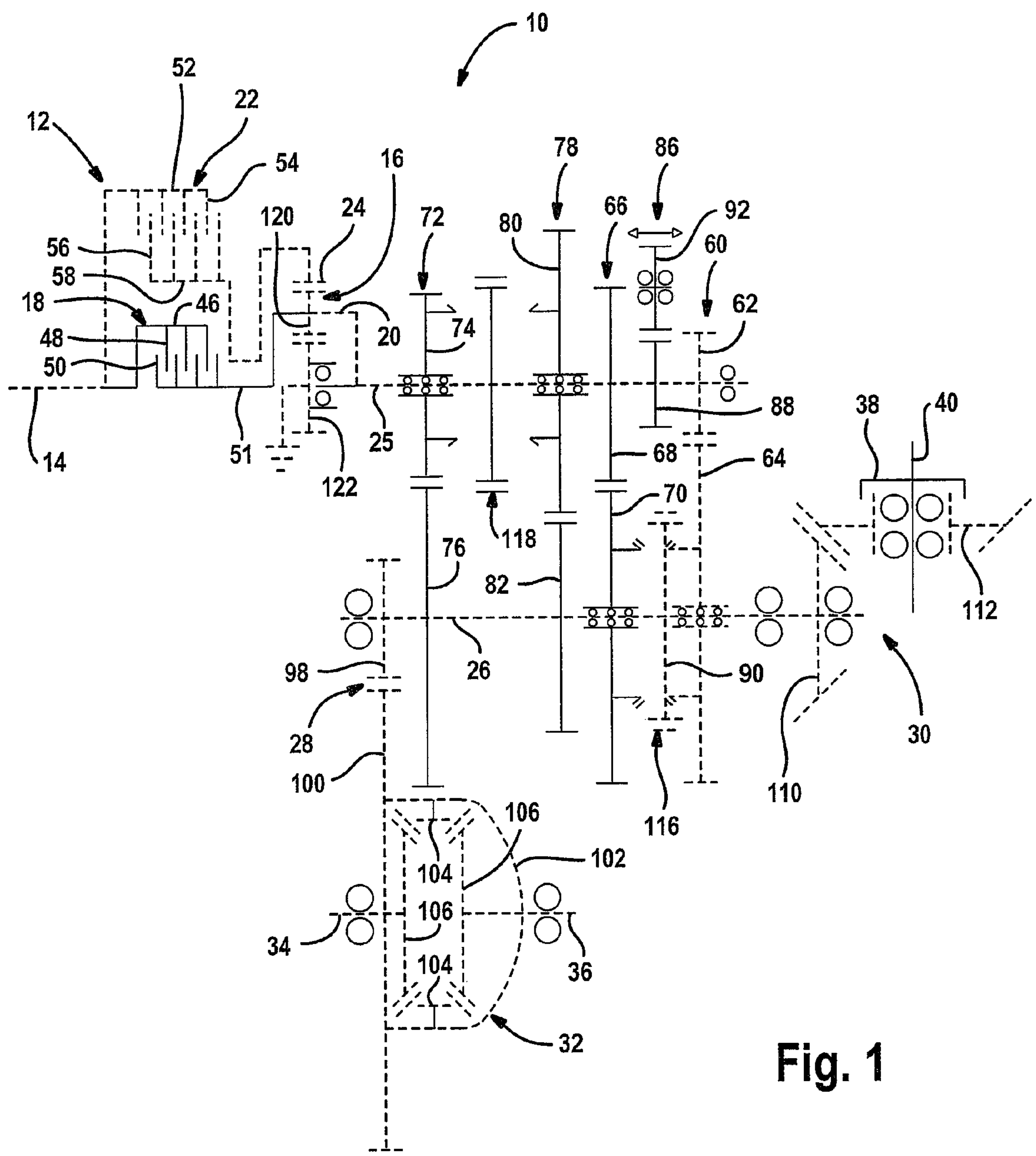
FIG. 1 is a schematic representing an eight-speed dual clutch transaxle depicting a power flow for a first forward drive ratio.

The following description is merely exemplary in nature and is not intended to limit the present disclosure, application, or uses. It should be understood that throughout the drawings, corresponding reference numerals indicate like or corresponding parts and features.

FIG. 1 is a schematic representing a transaxle 10 having a dual clutch 12 driven by a main shaft 14. A planetary gearset 16 may selectively receive torque transferred through dual clutch 12. Dual clutch 12 includes a first clutch 18 that is selectively operable to transfer torque to an output member, such as a carrier 20, of planetary gearset 16. A second clutch 22 is selectively operable to transfer torque from main shaft 14 to an input member, such as a ring gear 24, of planetary gearset 16. Carrier 20 is fixed for rotation with an input shaft 25. Various speed gearsets are selectively operable to transfer torque from input shaft 25 to a countershaft 26. Power is transferred from countershaft 26 to a final drive unit 28 and a power take-off unit 30. Final drive unit 28 transfers torque to a differential assembly 32 arranged to drive axle shafts 34 and 36. A clutch 38 selectively transfers power from power take-off unit 30 to an output shaft 40.

First clutch 18 includes a first drum 46 fixed for rotation with main shaft 14. A set of outer first clutch plates 48 are fixed for rotation with and axially moveable relative to first drum 46. A set of inner first clutch plates 50 are fixed for rotation with carrier 20. Inner first clutch plates 50 are axially moveable relative to and fixed for rotation with a hub 51 which is fixed to carrier 20. Inner first clutch plates 50 are interleaved with outer first clutch plates 48. A first power-operated actuator (not shown) selectively compresses outer first clutch plates 48 with inner first clutch plates 50 to transfer torque through first clutch 18 from main shaft 14 to input shaft 25.

Second clutch 22 includes a second drum 52 fixed for rotation with main shaft 14. A set of outer second clutch plates 54 are fixed for rotation with and axially moveable relative to second drum 52. A set of inner second clutch plates 56 are fixed for rotation with and axially moveable relative to a hub 58. Hub 58 is fixed for rotation with ring gear 24. Inner second clutch plates 56 are interleaved with outer second clutch plates 54. A second power-operated actuator (not shown) or a portion of the first power-operated actuator may be operable to cause torque transfer from main shaft 14 to input shaft 25 through second clutch 22 by compressing outer second clutch plates 54 against inner second clutch plates 56.

Second clutch 22 may encompass or partially envelop first clutch 18 to minimize the volume of space required to house dual clutch 12. In particular, an outer diameter of first drum 46 may be less than an inner diameter of hub 58 to allow first clutch 18 to nest within second clutch 22. Alternatively, if a greater torque capacity is required for first clutch 18, the outer diameter of first drum 46 may be increased to be equal or greater than the inner diameter of hub 58. As such, a modified nesting or axial adjacent arrangement of first clutch 18 and second clutch 22 may result.

A first speed gearset 60 is operable to transfer torque from input shaft 25 to countershaft 26 when transaxle 10 provides either of a first and a second forward drive ratio. First speed gearset 60 includes a first drive gear 62 fixed for rotation with input shaft 25. A first driven gear 64 is supported for rotation on countershaft 26. First drive gear 62 is in constant meshed engagement with first driven gear 64.

A second speed gearset 66 includes a second drive gear 68 fixed for rotation with input shaft 25. A second driven gear 70 is rotatably supported on countershaft 26. Second drive gear 68 is in constant meshed engagement with second driven gear 70. Second speed gearset 66 is operable to transfer torque from input shaft 25 to countershaft 26 when transaxle 10 provides either of a third or a fourth forward drive ratio.

A third speed gearset 72 includes a third drive gear 74 supported for rotation on input shaft 25. A third driven gear 76 is fixed for rotation with countershaft 26. Third drive gear 74 is in constant meshed engagement with third driven gear 76. Third speed gearset 72 is operable to transfer torque from input shaft 25 to countershaft 26 when transaxle 10 provides either of a fifth or sixth forward drive ratio.

A fourth speed gearset 78 includes a fourth drive gear 80 rotatably supported on input shaft 25. A fourth driven gear 82 is rotatably fixed for rotation with countershaft 26. Fourth drive gear 80 is in constant meshed engagement with fourth driven gear 82. Fourth speed gearset 78 transfers torque when transaxle 10 provides either of a seventh or eighth forward drive ratio.

A reverse speed gearset 86 includes a reverse drive gear 88 fixed for rotation with input shaft 25. A reverse driven gear 90 is rotatably supported on countershaft 26. An axially moveable reverse idler gear 92 may be selectively translated into and out of meshed engagement with reverse drive gear 88 and reverse driven gear 90 to provide a reverse gear ratio.

Final drive unit 28 includes a pinion gear 98 fixed for rotation with countershaft 26 and a ring gear 100 in constant meshed engagement with pinion gear 98. Differential assembly 32 includes a carrier 102 fixed for rotation with ring gear 100. Differential assembly 32 also includes a pair of differential pinion gears 104 supported for rotation by carrier 102. Differential side gears 106 are positioned in constant meshed engagement with differential pinion gears 104. Axle shafts 34, 36 are each driven by one of differential side gears 106.

Power take-off unit 30 includes a PTO pinion gear 110 fixed for rotation with countershaft 26. A PTO ring gear 112 is positioned in constant meshed engagement with PTO pinion gear 110. PTO ring gear 112 is rotatably supported on output shaft 40. Clutch 38 selectively drivingly interconnects PTO ring gear 112 with output shaft 40 to transfer torque to another axle or set of axles (not shown). Transaxle 10 also includes first and second shifting mechanism that will be described in greater detail hereinafter. The figures depict first and second synchronizer clutches 116 and 118, respectively. It should be appreciated that any number of other mechanisms such as dog clutches or plate clutches may be used.

Transaxle 10 is configured to provide eight forward drive ratios and one reverse drive ratio. Transaxle 10 is relatively lightweight and compact. These features are at least partially accomplished through the implementation of only four speed gearsets to provide the eight forward drive ratios.

FIGS. 1-9 depict power flow through the various components of transaxle 10 for each of the first through eighth forward drive ratios as well as the reverse drive ratio. FIG. 1 diagrammatically depicts the flow of power through transaxle 10 when a first drive ratio is being provided. Prior to transferring power at the first drive ratio, second synchronizer clutch 118 is shifted to its neutral position to allow third drive gear 74 and fourth drive gear 80 to rotate freely relative to input shaft 25. First synchronizer clutch 116 may be preselected and shifted to the right to drivingly interconnect first driven gear 64 with countershaft 26.

Second clutch 22 may now be actuated to transfer torque from main shaft 14 to hub 58. Torque is input to ring gear 24 and output from carrier 20. Planetary gearset 16 also includes a plurality of pinion gears 120 that are rotatably supported by carrier 20. Each pinion gear 120 is in constant meshed engagement with ring gear 24 and a sun gear 122. Sun gear 122 of planetary gearset 16 is restricted from rotation. In this manner, planetary gearset 16 acts as an underdrive unit when second clutch 22 is engaged. In the example shown, planetary gearset 16 provides an underdrive ratio of about 1.28:1. Torque continues to be transferred from carrier 20 to input shaft 25 and through first drive gear 62, first driven gear 64, first synchronizer clutch 116, countershaft 26 and final drive unit 28. If it is desirable to transfer torque to axle shafts other than axles 34 and 36, clutch 38 may be selectively actuated to cause torque to transfer from countershaft 26 through power take-off unit 30, clutch 38 and output shaft 40.

Figure 2:
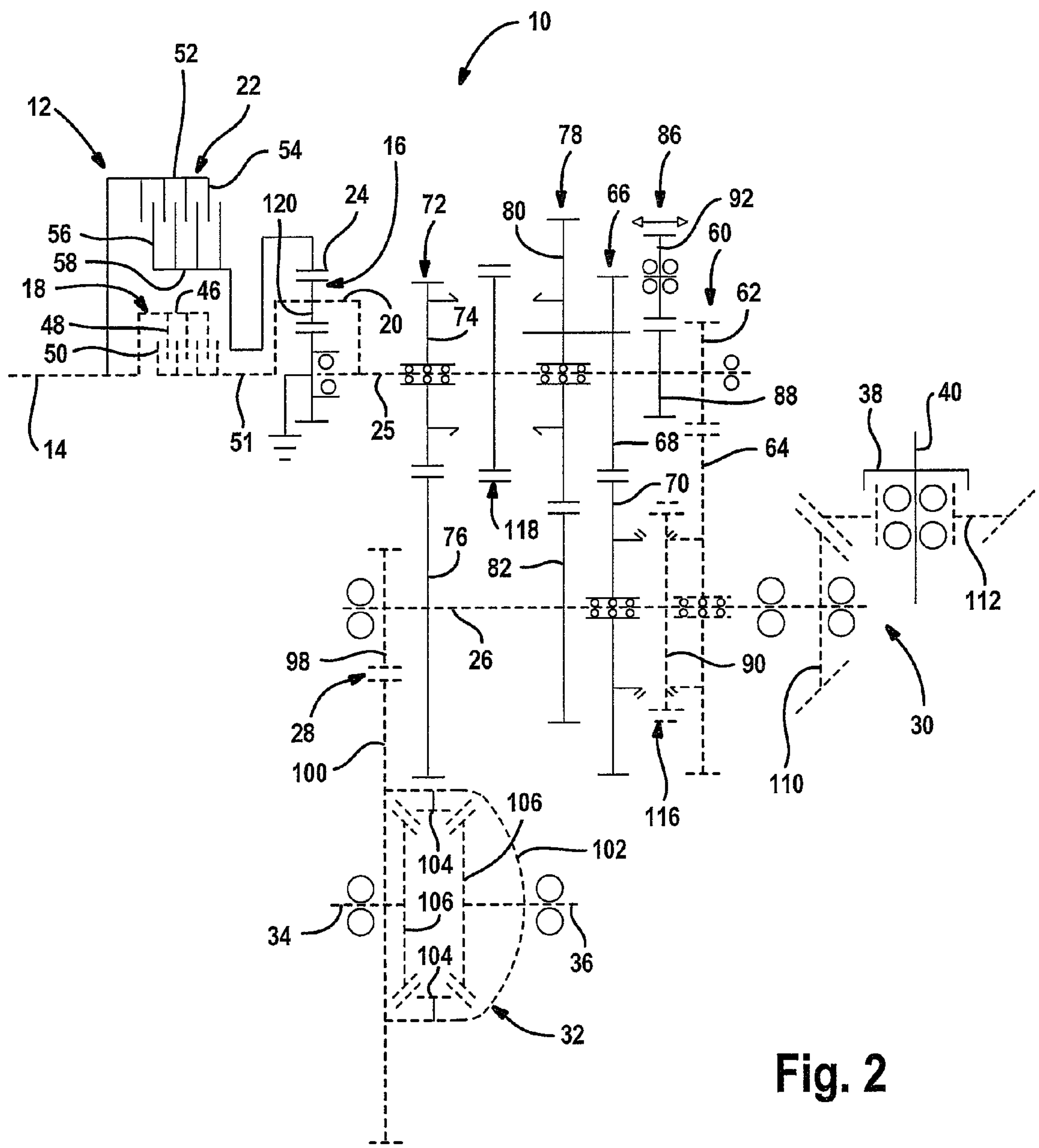
FIG. 2 is a schematic depicting a power flow when the transaxle provides a second forward drive ratio.

FIG. 2 depicts power flow through transaxle 10 during operation in a second forward drive ratio. To shift from the first forward drive ratio to the second forward drive ratio, first synchronizer clutch 116 and second synchronizer clutch 118 remain in their previously defined positions. Second clutch 22 is disengaged while first clutch 18 is engaged. To execute a sequential power shift from the first drive ratio to the second drive ratio, a time overlap exists between disengagement of second clutch 22 and engagement of first clutch 18. Simultaneous actuation and de-actuation of the clutches within dual clutch 12 provides a smooth, uninterrupted flow of power to axle shafts 34 and 36. Once the second clutch 22 is fully disengaged, power flows from main shaft 14 through first clutch 18, carrier 20, input shaft 25, first drive gear 62, first driven gear 64, first synchronizer clutch 116, countershaft 26, final drive unit 28 and differential assembly 32 to axle shafts 34 and 36. With first clutch 18 engaged, power is transferred through planetary gearset 16 at a direct drive or 1:1 ratio. As such, the "split" between the first forward drive ratio and the second forward drive ratio is 1.28:1.

Figure 3:
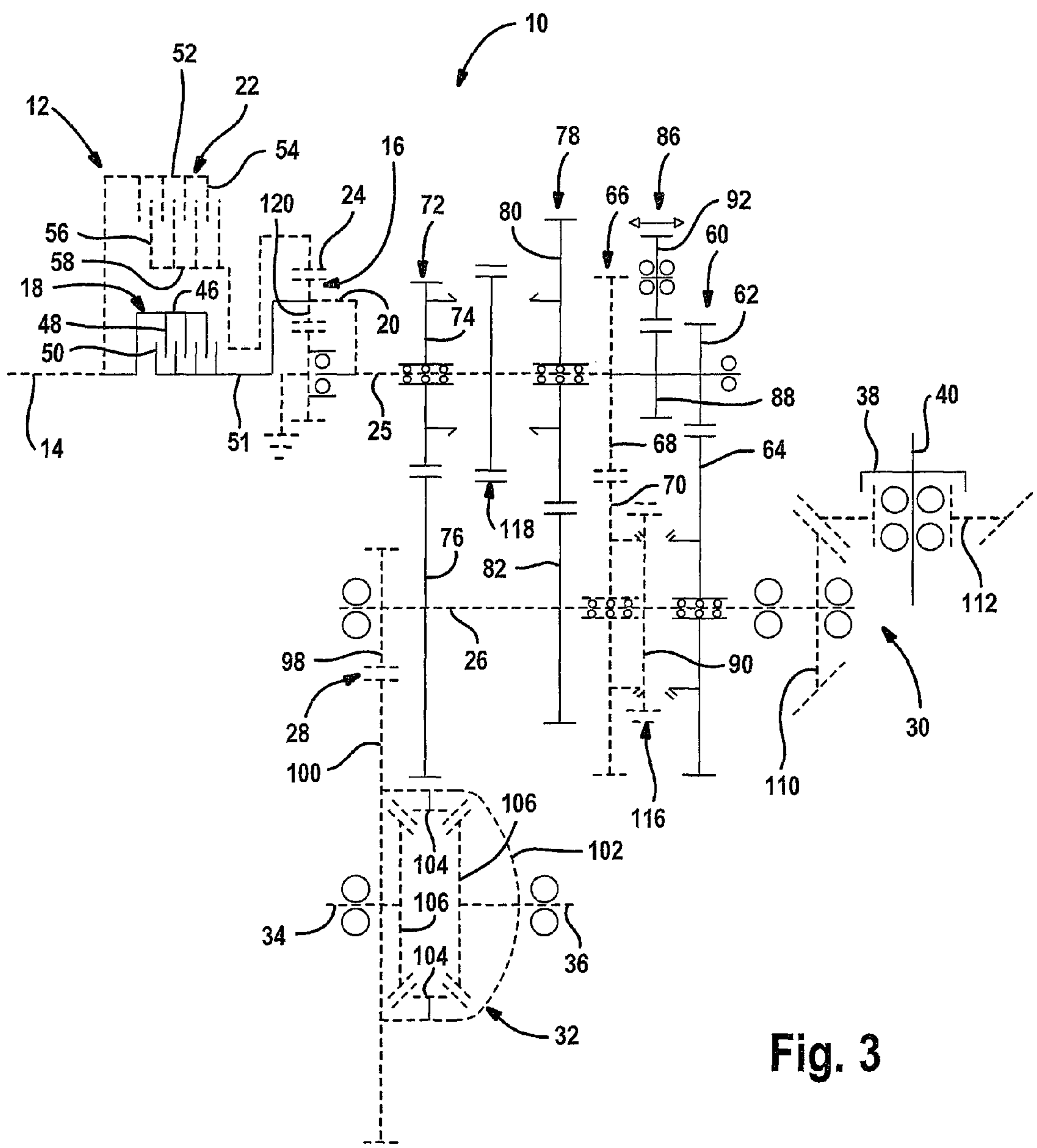
FIG. 3 is a schematic depicting a power flow when the transaxle provides a third forward drive ratio.
Figure 4:
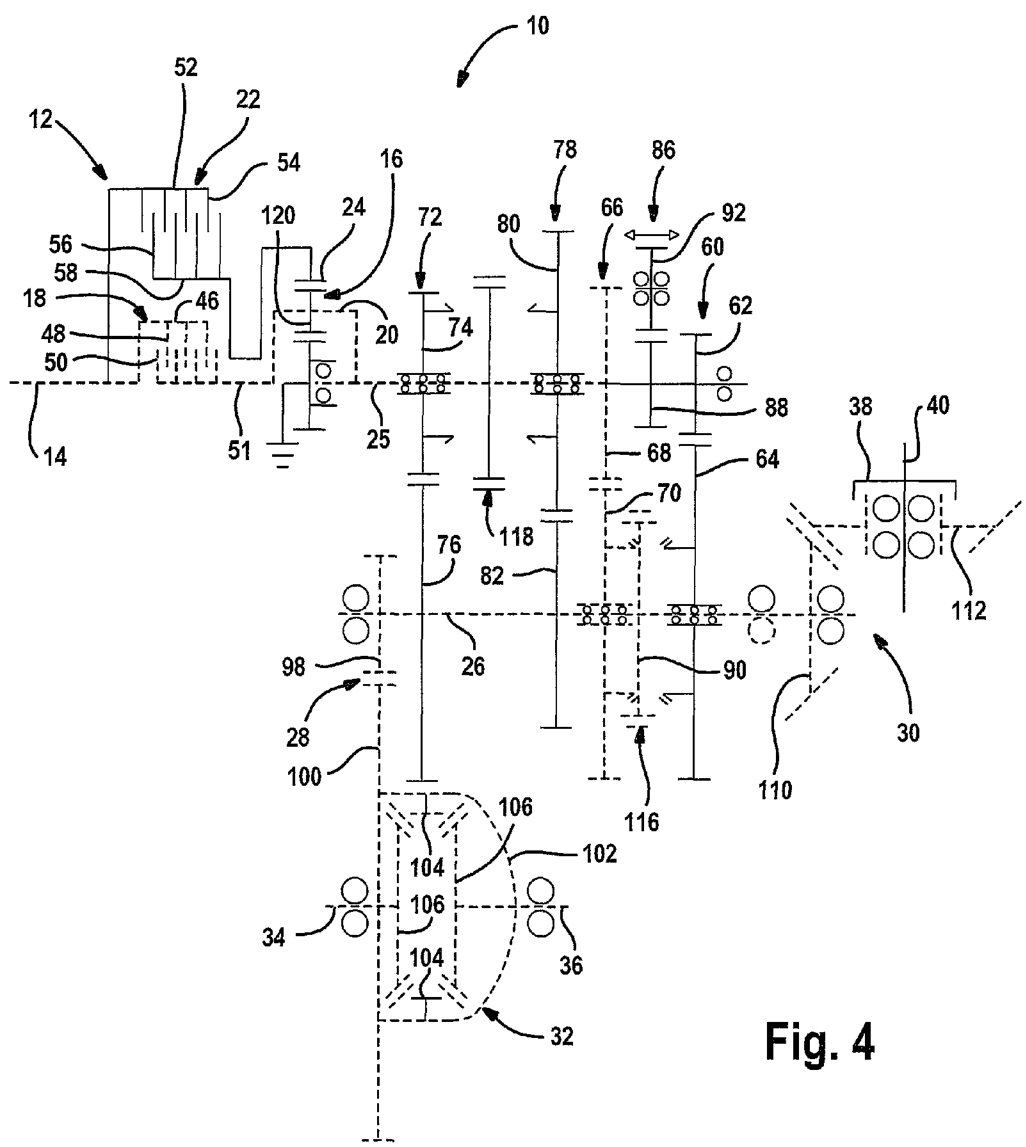
FIG. 4 is a schematic depicting a power flow when the transaxle provides a fourth forward drive ratio.

FIG. 3 depicts the flow of power achieved during the third forward drive ratio. To perform a sequential up-shift from the second forward drive ratio to the third forward drive ratio, first synchronizer clutch 116 is shifted from its right-most position to its left-most position to drivingly couple second driven gear 70 to countershaft 26. Substantially simultaneously with this synchronizer shift, first clutch 18 is disengaged while second clutch 22 is engaged. Once these shifts have occurred, planetary gearset 16 is placed in the underdrive mode once again. During operation within the third forward drive ratio, torque is transferred from main shaft 14 through second clutch 22, ring gear 24, carrier 20, input shaft 25, second drive gear 68, second driven gear 70, first synchronizer clutch 116, countershaft 26, final drive unit 28 and differential assembly 32 to axle shafts 34 and 36. First speed gearset 60 and second speed gearset 66 are configured to provide spaced gear ratios at the same multiple or "split" as planetary gearset 16. Therefore, a 2-3 up-shift causes a reduction in gear ratio by a multiple of about 1.28. Third speed gearset 72 and fourth speed gearset 78 are similarly configured. Accordingly, each sequential up-shift reduces the gear ratio by a multiple of about 1.28.

A sequential up-shift from the third forward drive ratio to the fourth forward drive ratio occurs in substantially the same manner as a 1-2 shift. In particular, the positions of first synchronizer clutch 116 and second synchronizer clutch 118 remain in their previous locations. A clutch-to-clutch shift release second clutch 22 and engage first clutch 18 causes torque to transfer through planetary gearset 16 in a direct drive manner having an input to output ratio of 1:1 instead of the underdrive ratio previously provided. Second clutch 22 is disengaged while first clutch 18 is engaged to accomplish this task. Once transaxle 10 is placed in the fourth forward drive ratio, torque is transferred from main shaft 14 through first clutch 18, carrier 20, input shaft 25, second drive gear 68, second driven gear 70, first synchronizer clutch 116, countershaft 26, final drive unit 28 and differential assembly 32 to driven axle shafts 34 and 36.

Figure 5:
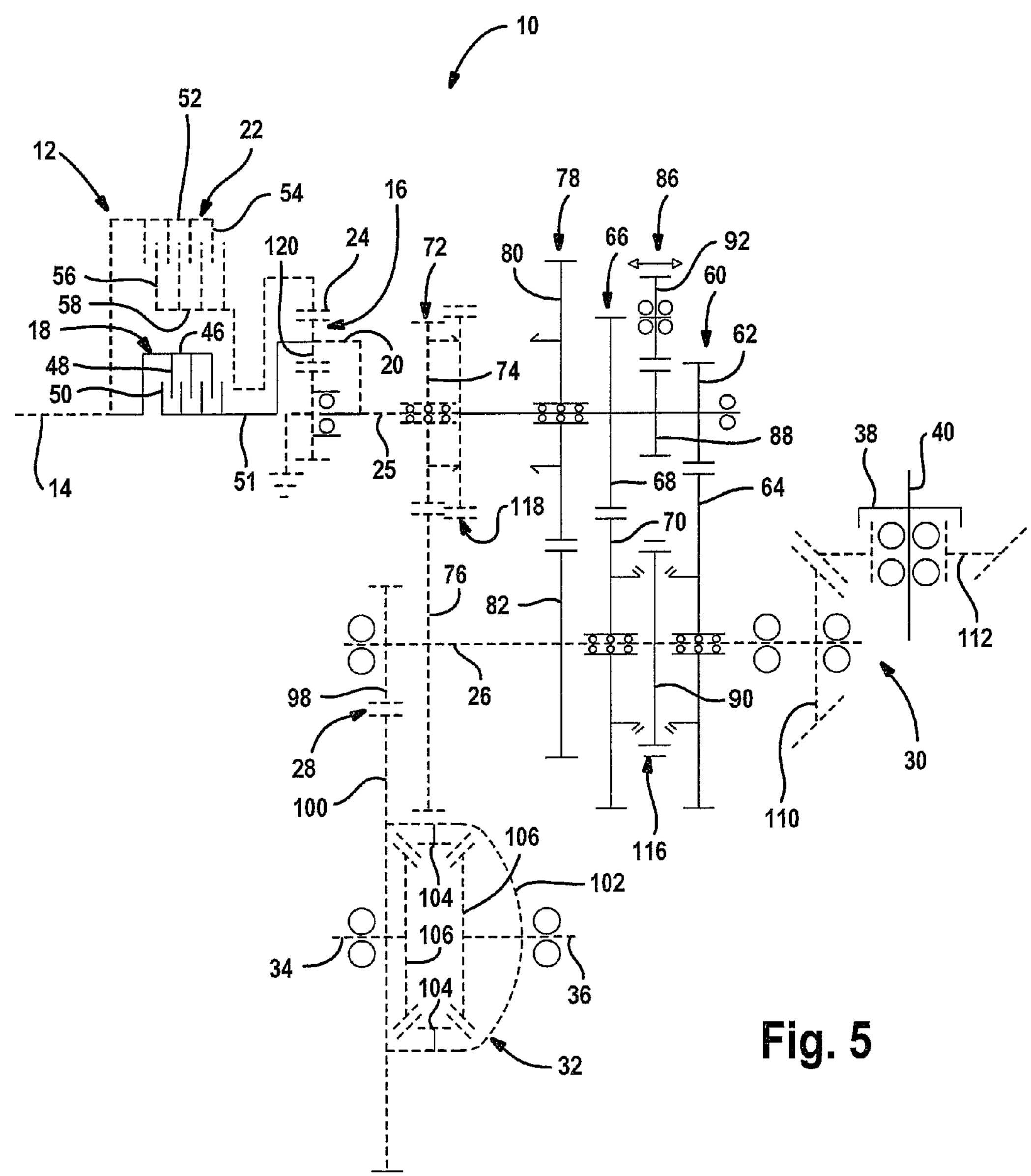
FIG. 5 is a schematic depicting a power flow when the transaxle provides a fifth forward drive ratio.

FIG. 5 depicts power being transferred through transaxle 10 at a fifth forward drive ratio. A sequential fourth to fifth gear up-shift is accomplished by moving first synchronizer clutch 116 to its neutral or centered position where both first driven gear 64 and second driven gear 70 are free to rotate relative to countershaft 26. Second synchronizer clutch 118 is shifted to the left to drivingly couple third drive gear 74 to input shaft 25. First clutch 18 is disengaged while second clutch 22 is engaged to place planetary gearset 16 in the underdrive mode. Once the fifth forward drive ratio is being provided, torque is transferred from main shaft 14 through second clutch 22, ring gear 24, carrier 20, input shaft 25, second synchronizer clutch 118, third drive gear 74, third driven gear 76, countershaft 26, final drive unit 28 and differential assembly 32 to axle shafts 34 and 36.

Figure 6:
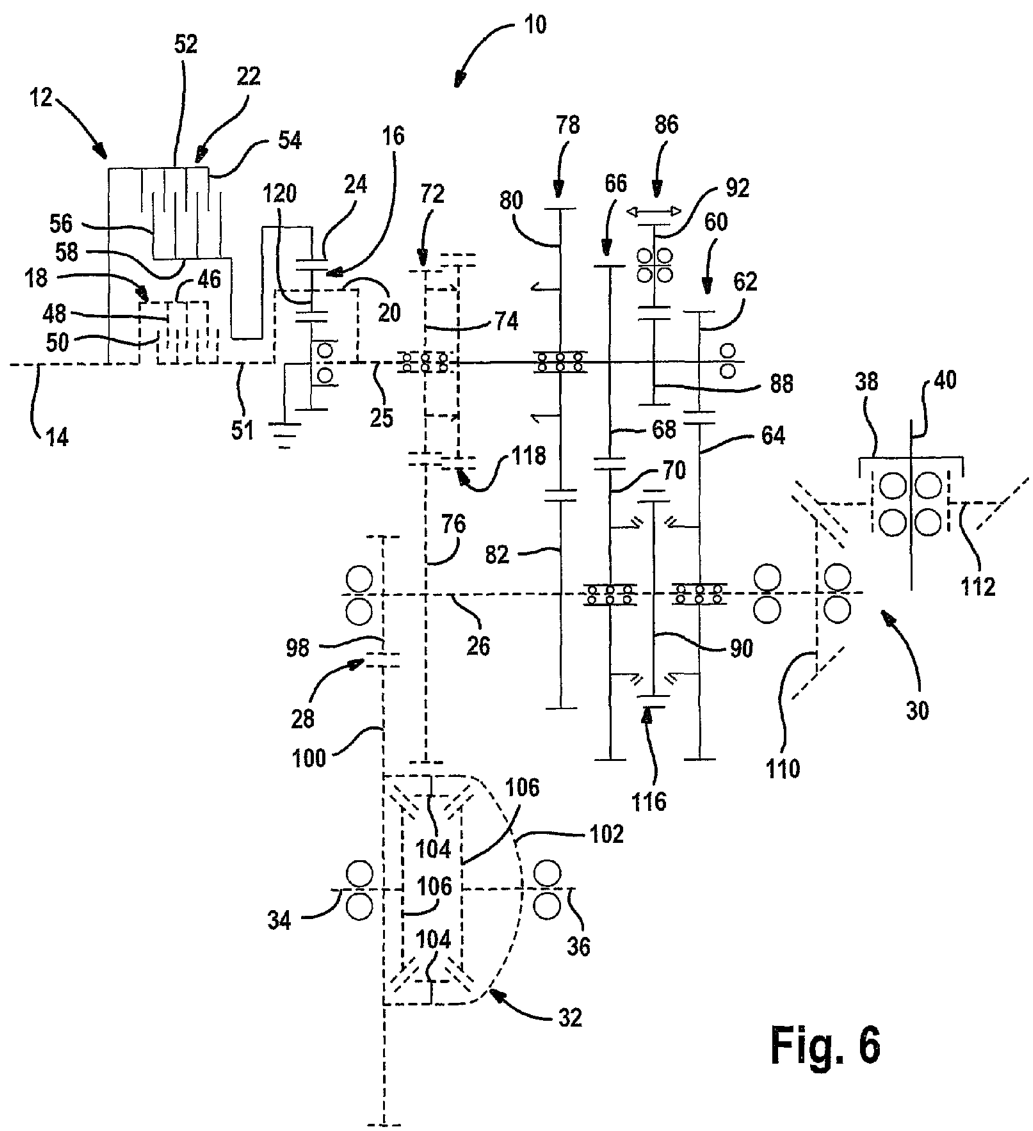
FIG. 6 is a schematic depicting a power flow when the transaxle provides a sixth forward drive ratio.

FIG. 6 shows the flow of power through transaxle 10 during operation in the sixth forward drive ratio. A fifth to sixth gear up-shift occurs substantially similarly to the 1-2 and 3-4 up-shifts previously described. In particular, the locations of first synchronizer clutch 116 and second synchronizer clutch 118 remain the same during the fifth forward drive ratio and the sixth forward drive ratio. As such, the only change that is made occurs by deactuating second clutch 22 and actuating first clutch 18 to transfer torque from main shaft 14 to input shaft 25 at a direct drive or 1:1 ratio. During the sixth forward drive ratio, torque is transferred from main shaft 14 through first clutch 18, carrier 20, input shaft 25, second synchronizer clutch 118, third drive gear 74, third driven gear 76, countershaft 26, final drive unit 28 and differential assembly 32.

Figure 7:
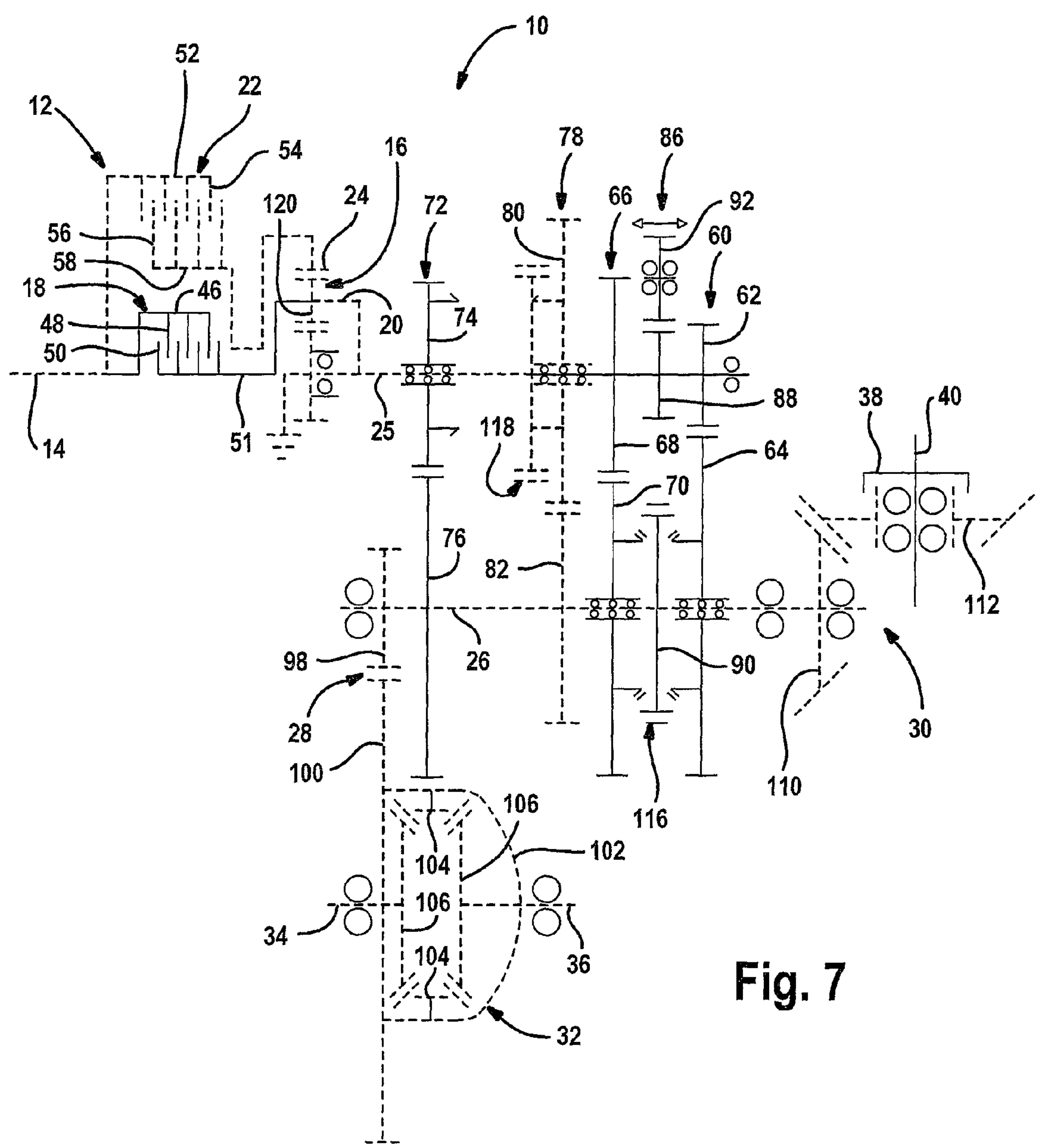
FIG. 7 is a schematic depicting a power flow when the transaxle provides a seventh forward drive ratio.

FIG. 7 shows the flow of power through transaxle 10 during operation within the seventh forward drive ratio. A sequential up-shift from the sixth forward drive ratio to the seventh forward drive ratio may be accomplished by maintaining the present position of first synchronizer clutch 116 in the center or neutral position and shifting second synchronizer clutch 118 to the right-most position to drivingly couple fourth drive gear 80 with input shaft 25. First clutch 18 is deactuated while second clutch 22 is actuated. Once the synchronizer shifting and clutch actuation changes have been completed, torque is transferred from main shaft 14 through second clutch 22, ring gear 24, carrier 20, input shaft 25, second synchronizer clutch 118, fourth drive gear 80, fourth driven gear 82, countershaft 26, final drive unit 28 and differential assembly 32 to driven axle shafts 34 and 36.

Figure 8:
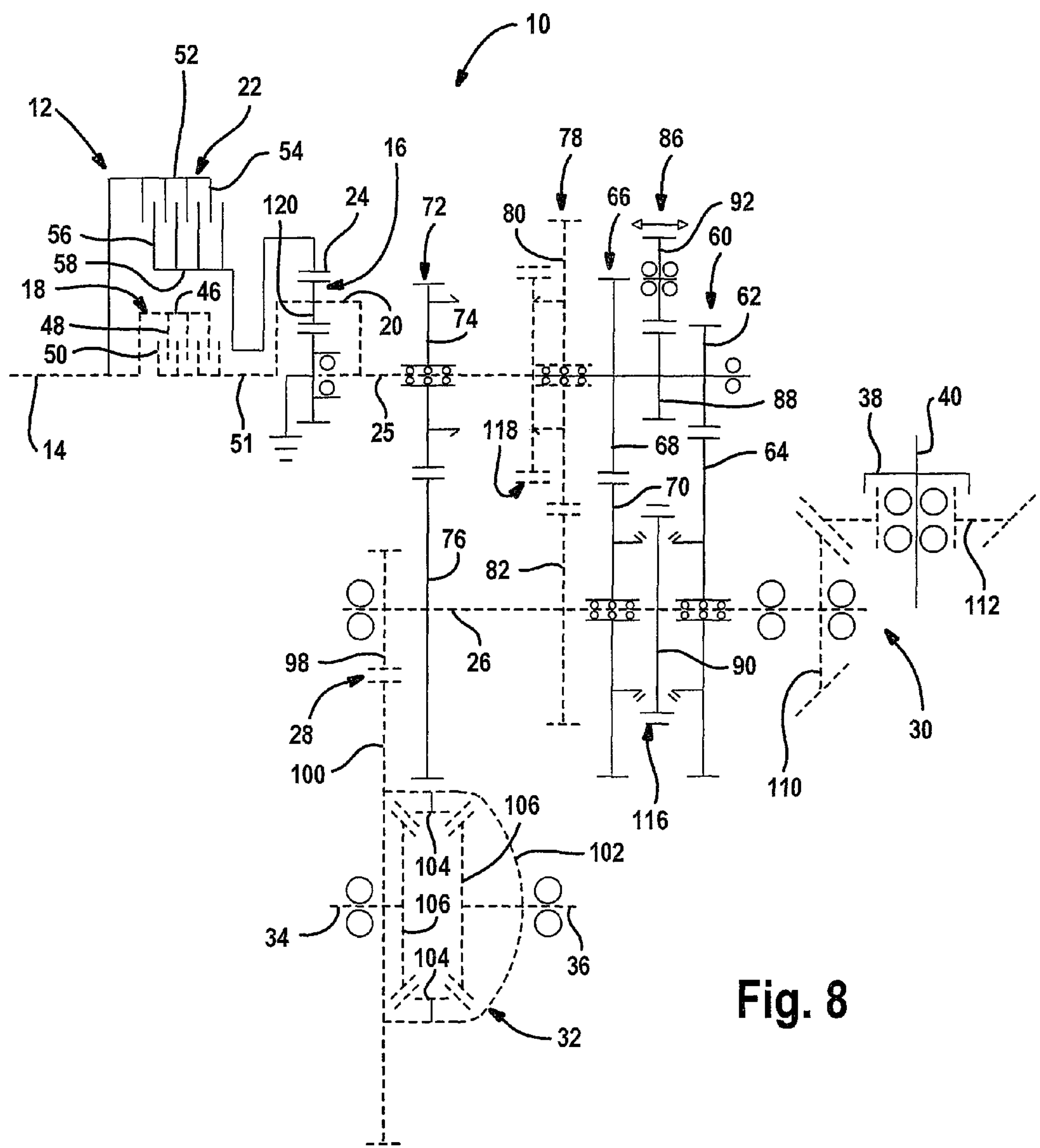
FIG. 8 is a schematic depicting a power flow when the transaxle provides an eighth forward drive ratio.

The flow of power through transaxle 10 while providing the eighth forward drive ratio is shown in FIG. 8. A 7-8 sequential up-shift is accomplished by maintaining the current positions of first synchronizer clutch 116 and second synchronizer clutch 118. A clutch-to-clutch power shift may be commanded to begin de-actuation of second clutch 22 substantially simultaneously with beginning actuation of first clutch 18. First clutch 18 and second clutch 22 transfer at least some torque simultaneously with one another. As such, an interruption of power flow to axles 34 and 36 does not occur during the up-shift. Once the clutch shift is complete, power is transferred from main shaft 14 through first clutch 18, carrier 20, input shaft 25, second synchronizer clutch 118, fourth drive gear 80, fourth driven gear 82, countershaft 26, final drive unit 28 and differential assembly 32 to provide the eighth forward drive ratio.

Figure 9:
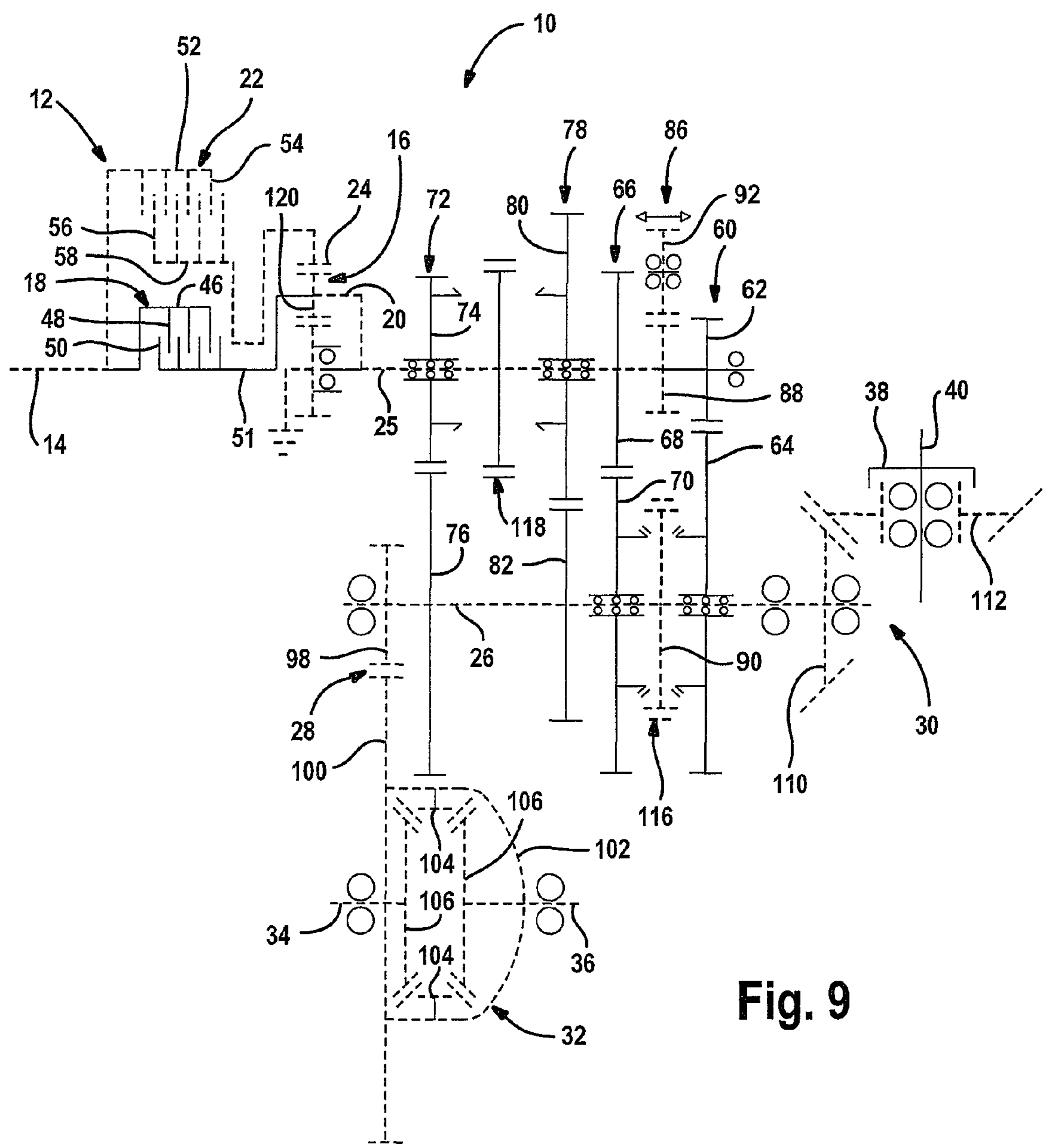
FIG. 9 is a schematic depicting a power flow when the transaxle provides a reverse gear ratio.

FIG. 9 depicts power flow through transaxle 10 during operation of the reverse gear ratio. As previously mention, reverse idler gear 92 is axially translatable into and out of engagement with reverse drive gear 88 and reverse driven gear 90. To provide the reverse drive ratio, first synchronizer clutch 116 and second synchronizer clutch 118 are moved to their centered or neutral positions. Power transfers from main shaft 14 through one of first clutch 18 and second clutch 22 through planetary gearset 16, input shaft 25, reverse drive gear 88, reverse idler gear 92, reverse driven gear 90, countershaft 26, final drive unit 28 and differential assembly 32.

Figure 10:
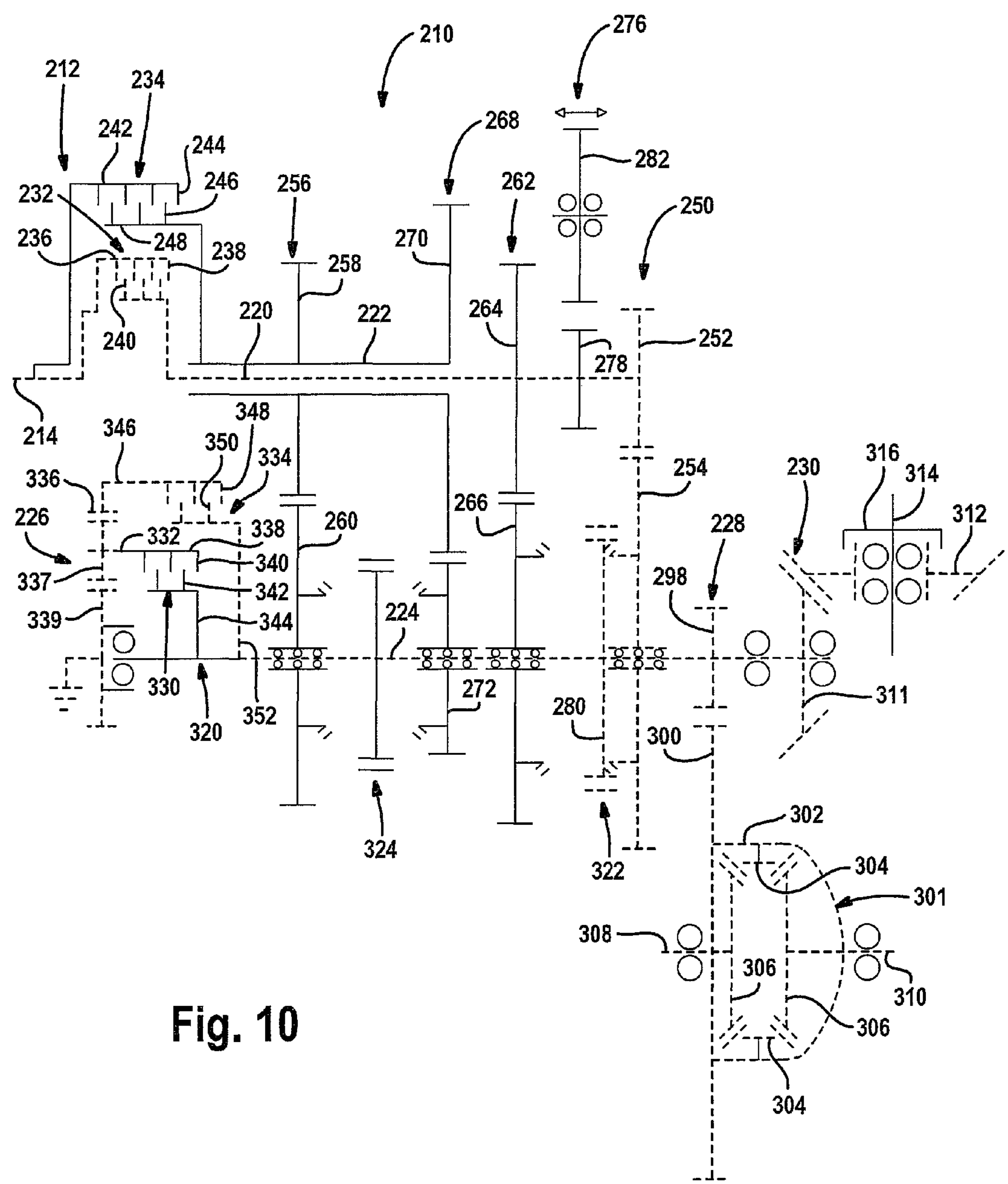
FIG. 10 is a schematic representing another eight-speed dual clutch transaxle and a power flow during operation in a first forward drive ratio.

FIG. 10 is a schematic representing a transaxle 210 having a first dual clutch 212 driven by a main shaft 214. During operation of first dual clutch 212, torque may be transferred from main shaft 214 to one or both of a first input shaft 220 and a second input shaft 222. Second input shaft 222 is shaped as a tube having at least a portion of first input shaft 220 extending therethrough. Various speed gearsets are selectively operable to transfer torque from one of first input shaft 220 and second input shaft 222 to a countershaft 224. Power is transferred through a planetary gearset 226 to a final drive unit 228 and a power take-off unit 230.

First dual clutch 212 includes a first clutch 232 and a second clutch 234. First clutch 232 is selectively operable to transfer torque from main shaft 214 to first input shaft 220. Similarly, second clutch 234 is selectively operable to transfer torque from main shaft 214 to second input shaft 222. First clutch 232 includes a first drum 236 fixed for rotation with main shaft 214. A set of outer first clutch plates 238 are fixed for rotation with and axially moveable relative to first drum 236. A set of inner first clutch plates 240 are fixed for rotation with first input shaft 220. Inner first clutch plates 240 are axially moveable relative to first input shaft 220 and interleaved with outer first clutch plates 238. A first power-operated actuator (not shown) may be operable to compress outer first clutch plates 238 with inner first clutch plates 240 to transfer torque through first clutch 232.

Second clutch 234 includes a second drum 242 fixed for rotation with main shaft 214. A set of outer second clutch plates 244 are fixed for rotation with and axially moveable relative to second drum 242. A set of inner second clutch plates 246 are fixed for rotation with and axially moveable relative to a hub 248. Hub 248 is fixed for rotation with second input shaft 222. Inner second clutch plates 246 are interleaved with outer second clutch plates 244. A second power-operated actuator (not shown) or a portion of the first power-operated actuator may be operable to cause torque transfer through second clutch 234 by compressing outer second clutch plates 244 against inner second clutch plates 246.

Second clutch 234 may encompass or partially envelop first clutch 232 to minimize the volume of space required to house first dual clutch 212. In particular, an outer diameter of first drum 236 may be less than an inner diameter of hub 248 to allow first clutch 232 to nest within second clutch 234. Alternatively, if a greater torque capacity is required for first clutch 232, the outer diameter of first drum 236 may be increased to be equal or greater than the inner diameter of hub 248. As such, a modified nesting or axial adjacent arrangement of first clutch 232 and second clutch 234 may result.

A first speed gearset 250 is arranged to transfer torque from first input shaft 220 to countershaft 224. First speed gearset 250 includes a first drive gear 252 fixed for rotation with first input shaft 220. A first driven gear 254 is supported for rotation on countershaft 224. First drive gear 252 is in constant meshed engagement with first driven gear 254.

A second speed gearset 256 includes a second drive gear 258 fixed for rotation with second input shaft 222. A second driven gear 260 is rotatably supported on countershaft 224. Second drive gear 258 is in constant meshed engagement with second driven gear 260.

A third speed gearset 262 includes a third drive gear 264 fixed for rotation with first input shaft 220. A third driven gear 266 is rotatably supported on countershaft 224. Third drive gear 264 is in constant meshed engagement with third driven gear 266.

A fourth speed gearset 268 includes a fourth drive gear 270 fixed for rotation with second input shaft 222. A fourth driven gear 272 is rotatably supported on countershaft 224. Fourth drive gear 270 is in constant meshed engagement with fourth driven gear 272.

A reverse speed gearset 276 includes a reverse drive gear 278 fixed for rotation with first input shaft 220. A reverse driven gear 280 is fixed for rotation with countershaft 224. An axially moveable reverse idler gear 282 may be selectively translated into and out of simultaneous meshed engagement with reverse drive gear 278 and reverse driven gear 280 to provide a reverse drive ratio.

Final drive unit 228 includes a pinion gear 298 fixed for rotation with countershaft 224 and a ring gear 300 in constant meshed engagement with pinion gear 298. A differential assembly 301 is driven by final drive unit 228 and includes a carrier 302 fixed for rotation with ring gear 300. Differential assembly 301 also includes a pair of differential pinion gears 304 supported for rotation by carrier 302. Differential side gears 306 are positioned in constant meshed engagement with differential pinion gears 304. Axle shafts 308, 310 are each driven by one of differential side gears 306.

Power take-off unit 230 includes a PTO pinion gear 311 fixed for rotation with countershaft 224. A PTO ring gear 312 is positioned in constant meshed engagement with PTO pinion gear 311. PTO ring gear 312 is rotatably supported on an output shaft 314. A clutch 316 selectively drivingly interconnects PTO ring gear 312 with output shaft 314 to transfer torque to another axle or set of axles (not shown).

Transaxle 210 includes a second dual clutch 320 associated with planetary gearset 226 as well as first and second synchronizer clutches 322 and 324, respectively. It should be appreciated that any number of other mechanisms such as dog clutches or plate clutches may be used. Transaxle 210 is configured to provide eight forward drive ratios and at least one reverse drive ratio. Power shifting is possible between each sequential forward drive ratio. Transaxle 210 is relatively lightweight and compact. These features are at least partially accomplished by requiring only four speed gearsets to provide the eight forward drive ratios.

Second dual clutch 320 includes a third clutch 330 operable to selectively transfer torque between a carrier 332 of planetary gearset 226 and countershaft 224. A fourth clutch 334 is selectively operable to transfer torque between a ring gear 336 of planetary gearset 226 and countershaft 224. Planetary gearset 226 includes a plurality of pinion gears 337 rotatably supported on carrier 332. Each pinion gear 337 is in constant meshed engagement with ring gear 336 and a sun gear 339. Sun gear 339 is restricted from rotation.

Third clutch 330 includes a third drum 338 fixed for rotation with carrier 332. A set of outer third clutch plates 340 are fixed for rotation with and axially moveable relative to third drum 338. A set of inner third clutch plates 342 are fixed for rotation with countershaft 224. Inner third clutch plates 342 are axially moveable relative to and fixed for rotation with a hub 344. Hub 344 is fixed to countershaft 224. Inner third clutch plates 342 are interleaved with outer third clutch plates 340. A third power-operated actuator (not shown) selectively compresses outer third clutch plates 340 with inner third clutch plates 342 to transfer torque through third clutch 330.

Fourth clutch 334 includes a fourth drum 346 fixed for rotation with ring gear 336. A set of outer fourth clutch plates 348 are fixed for rotation with and axially moveable relative to fourth drum 346. A set of inner fourth clutch plates 350 are fixed for rotation with and axially moveable relative to a hub 352. Hub 352 is fixed for rotation with countershaft 224. Inner fourth clutch plates 350 are interleaved with outer fourth clutch plates 348. A fourth power-operated actuator (not shown) or a portion of the third power-operated actuator may be operable to cause torque transfer through fourth clutch 334 by compressing outer fourth clutch plates 348 against inner fourth clutch plates 350.

Fourth clutch 334 may encompass or partially envelop third clutch 330 to minimize the volume of space required to house second dual clutch 320. In particular, an outer diameter of third drum 338 may be less than an inner diameter of hub 352 to allow third clutch 330 to nest within fourth clutch 334. Alternatively, if a greater torque capacity is required for third clutch 330, the outer diameter of third drum 338 may be increased to be equal or greater than the inner diameter of hub 352. As such, a modified nesting or axial adjacent arrangement of third clutch 330 and fourth clutch 334 may result.

FIGS. 10-18 depict the power flow through the components of transaxle 210 for each of the first through eighth forward drive ratios as well as the reverse drive ratio. FIG. 10 diagrammatically depicts the flow of power through transaxle 210 when a first forward drive ratio is provided. Prior to transferring power at the first drive ratio, first synchronizer clutch 322 is shifted to the right to drivingly couple first driven gear 254 with countershaft 224. Second synchronizer clutch 324 is positioned at its neutral or centered position. Third clutch 330 is placed in the disengaged position and fourth clutch 334 may be actuated when the first forward drive ratio is preselected. These operating modes of third clutch 330 and fourth clutch 334 place planetary gearset 226 in an underdrive mode of operation. It is contemplated that the gears of planetary gearset 226 are sized to provide an underdrive ratio of about 1.68:1.

To launch the vehicle or provide torque at the first forward drive ratio, first clutch 232 is actuated while second clutch 234 remains or is deactuated. Power flows from main shaft 214 through first clutch 232, first input shaft 220, first drive gear 252, first driven gear 254, first synchronizer clutch 322, fourth clutch 334, planetary gearset 226, final drive unit 228 and differential assembly 301 to axle shafts 308, 310. If clutch 316 is actuated, torque also flows through power take-off unit 230 to output shaft 314.

Figure 11:
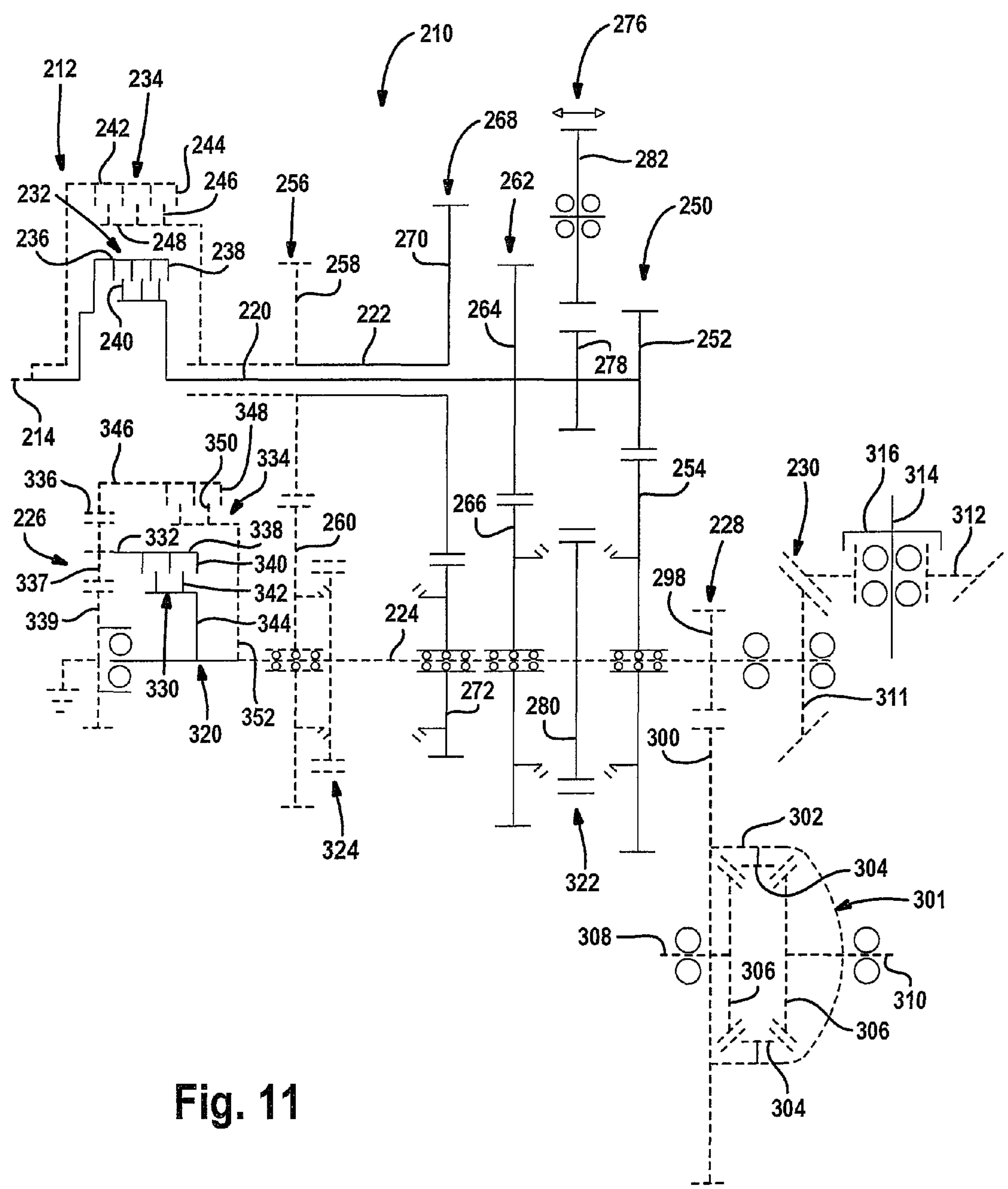
FIG. 11 is a schematic depicting a power flow when the transaxle of FIG. 10 provides a second forward drive ratio.

FIG. 11 depicts the flow of power through transaxle 210 during operation in the second forward drive ratio. To perform a 1-2 up-shift, second synchronizer clutch 324 may be moved to its left-most position to preselect the second forward drive ratio and drivingly couple second driven gear 260 to countershaft 224. Third clutch 330 and fourth clutch 334 remain in the same states of operation as when providing the first forward drive ratio. The power up-shift is completed by actuating second clutch 234 and simultaneously deactuating first clutch 232. At the completion of these steps, power flows from main shaft 214 through second clutch 234, second input shaft 222, second drive gear 258, second driven gear 260, second synchronizer clutch 324, countershaft 224, fourth clutch 334, planetary gearset 226, final drive unit 228 and differential assembly 301 to axle shafts 308 and 310.

Figure 12:
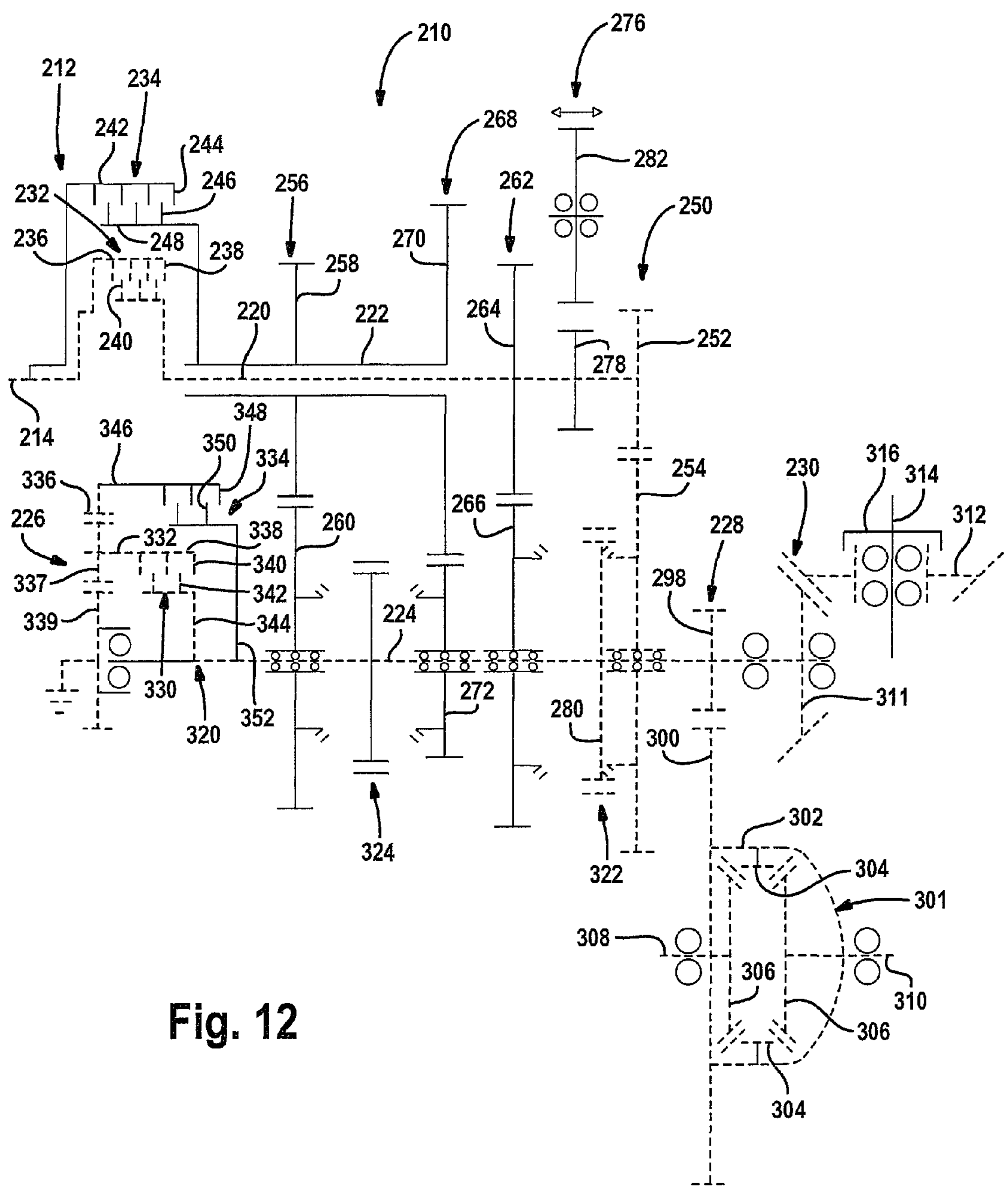
FIG. 12 is a schematic depicting a power flow when the transaxle of FIG. 10 provides a third forward drive ratio.

FIG. 12 depicts power flow through transaxle 210 during operation in a third forward drive ratio. To shift from the second forward drive ratio to the third forward drive ratio, first synchronizer clutch 322 remains in the right-most position, second synchronizer clutch 324 remains in the left-most position while fourth clutch 334 is deactuated and third clutch 330 is actuated. When third clutch 330 is actuated and fourth clutch 334 is deactuated, planetary gearset 226 is placed in the direct drive mode providing a 1:1 ratio. To complete the 2-3 up-shift, second clutch 234 is deactuated while first clutch 232 is actuated. For the third forward drive ratio, torque is transferred by first speed gearset 250 as it was during the first forward drive ratio. However, during the third forward drive ratio, planetary gearset 226 is operated in the direct drive mode instead of the underdrive mode as when providing the first forward drive ratio. During the third forward drive ratio, torque is transferred from main shaft 214 through first clutch 232, first input shaft 220, first drive gear 252, first driven gear 254, first synchronizer clutch 322, countershaft 224, third clutch 330, planetary gearset 226, final drive unit 228 and differential assembly 301 to axle shafts 308 and 310.

Figure 13:
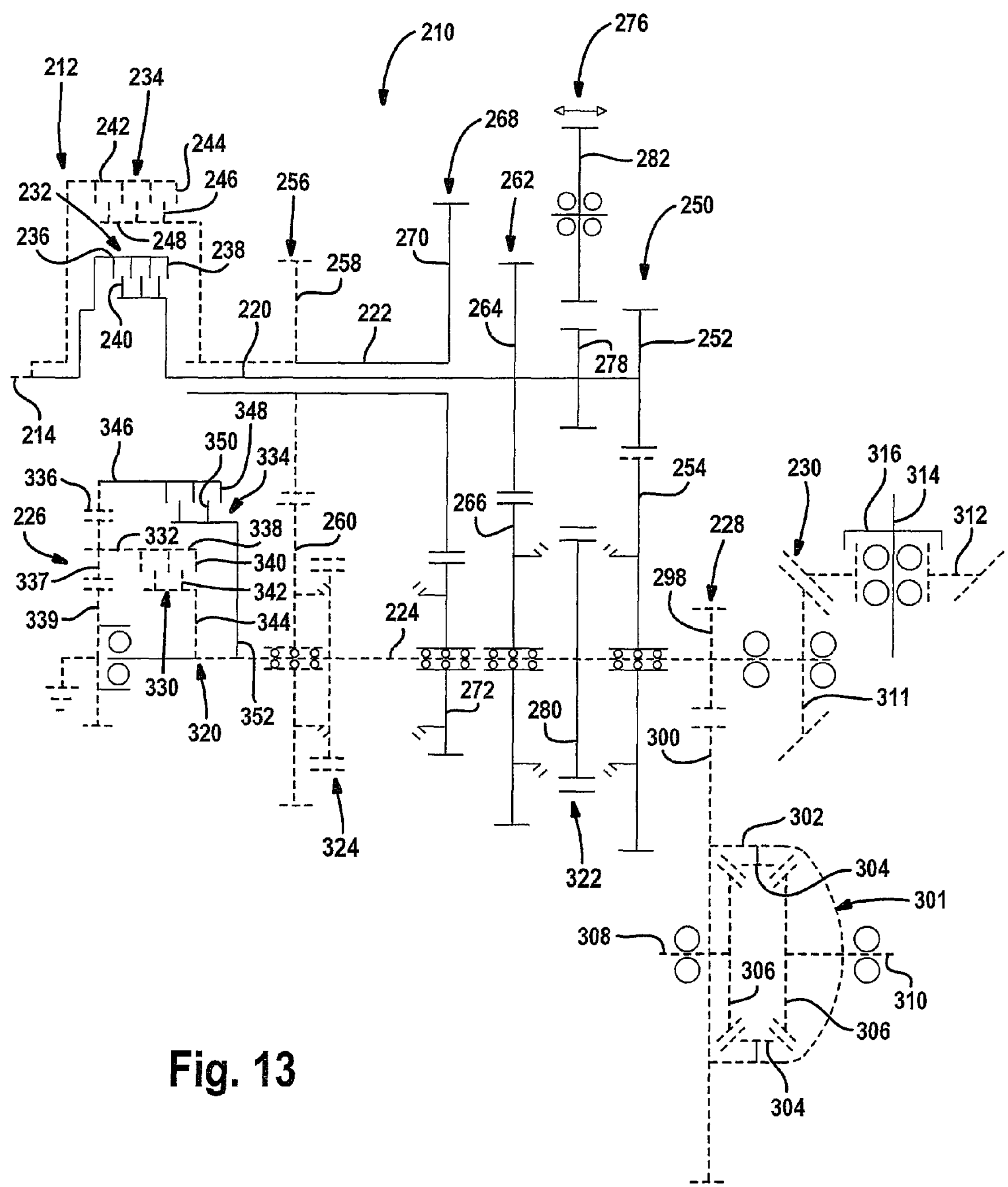
FIG. 13 is a schematic depicting a power flow when the transaxle of FIG. 10 provides a fourth forward drive ratio.
Figure 14:
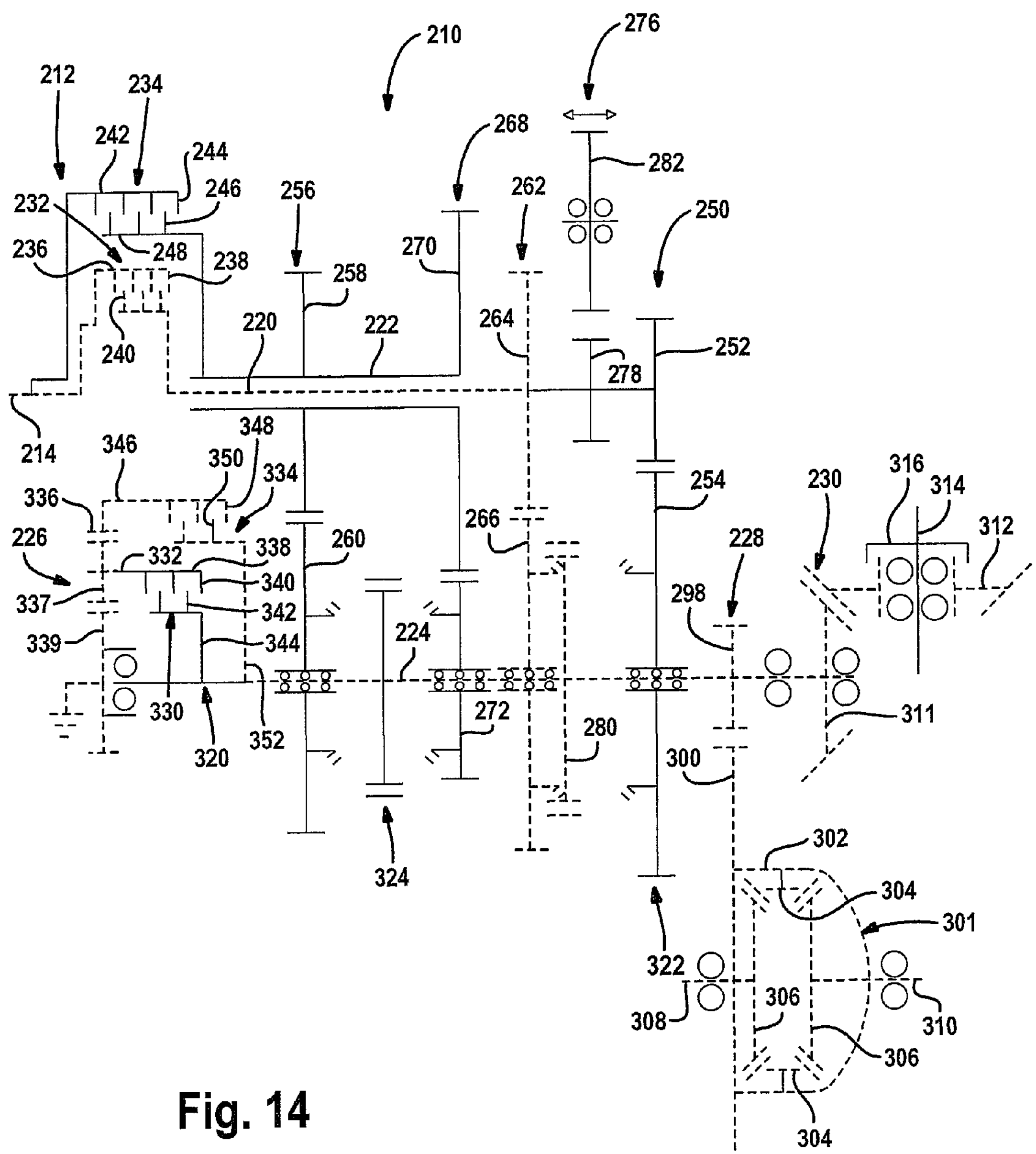
FIG. 14 is a schematic depicting a power flow when the transaxle of FIG. 10 provides a fifth forward drive ratio.
Figure 15:
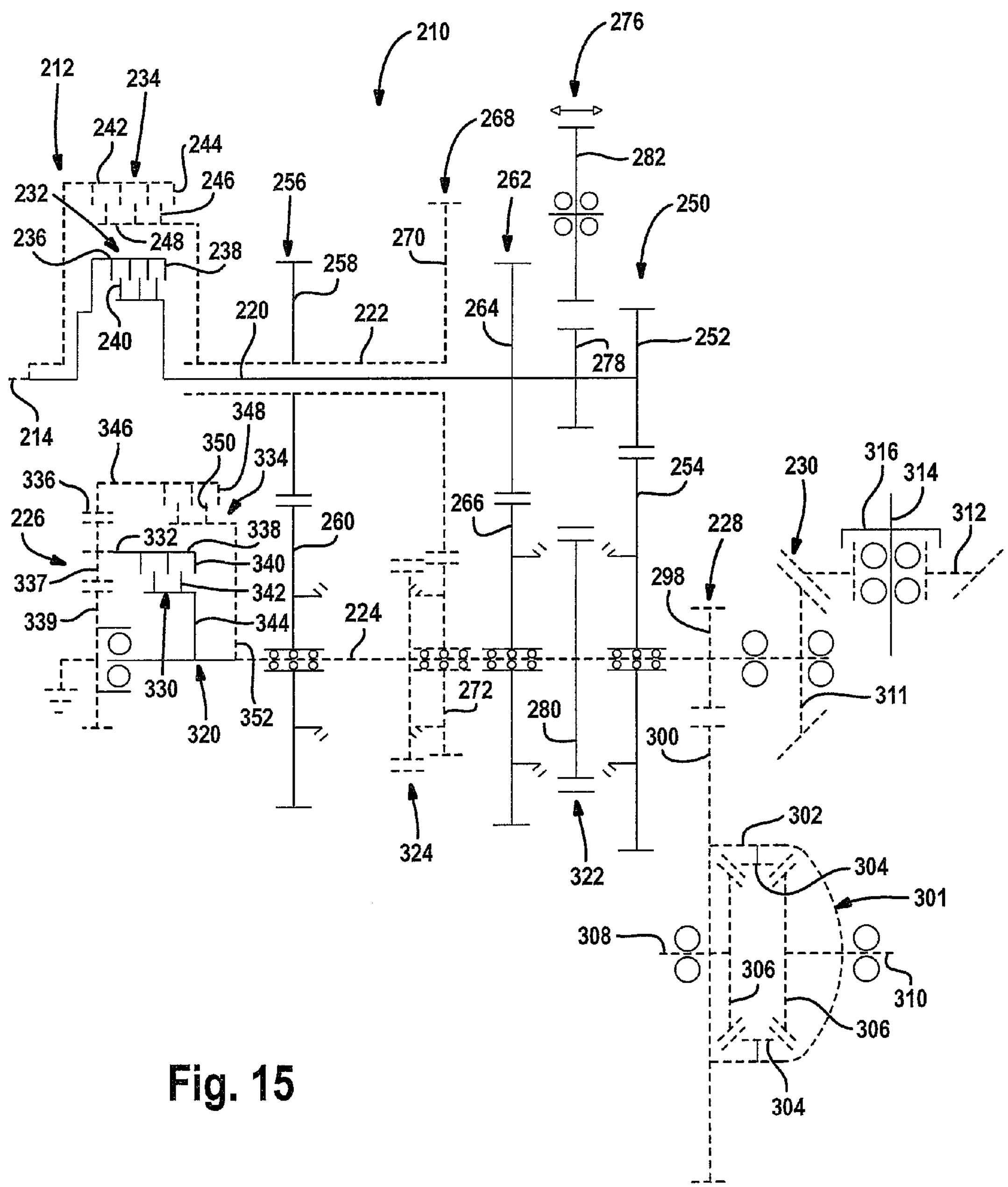
FIG. 15 is a schematic depicting a power flow when the transaxle of FIG. 10 provides a sixth forward drive ratio.
Figure 16:
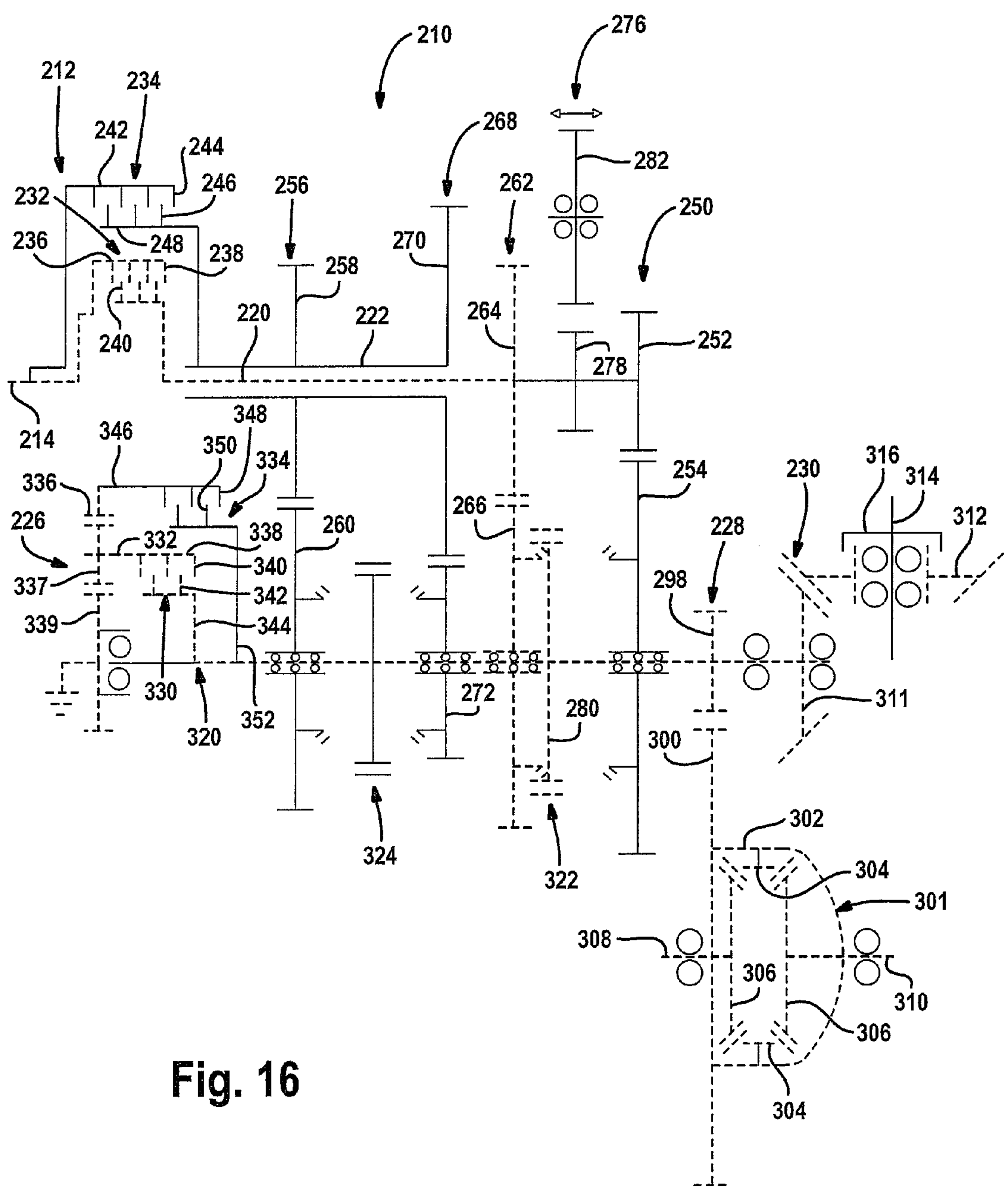
FIG. 16 is a schematic depicting a power flow when the transaxle of FIG. 10 provides a seventh forward drive ratio.
Figure 17:
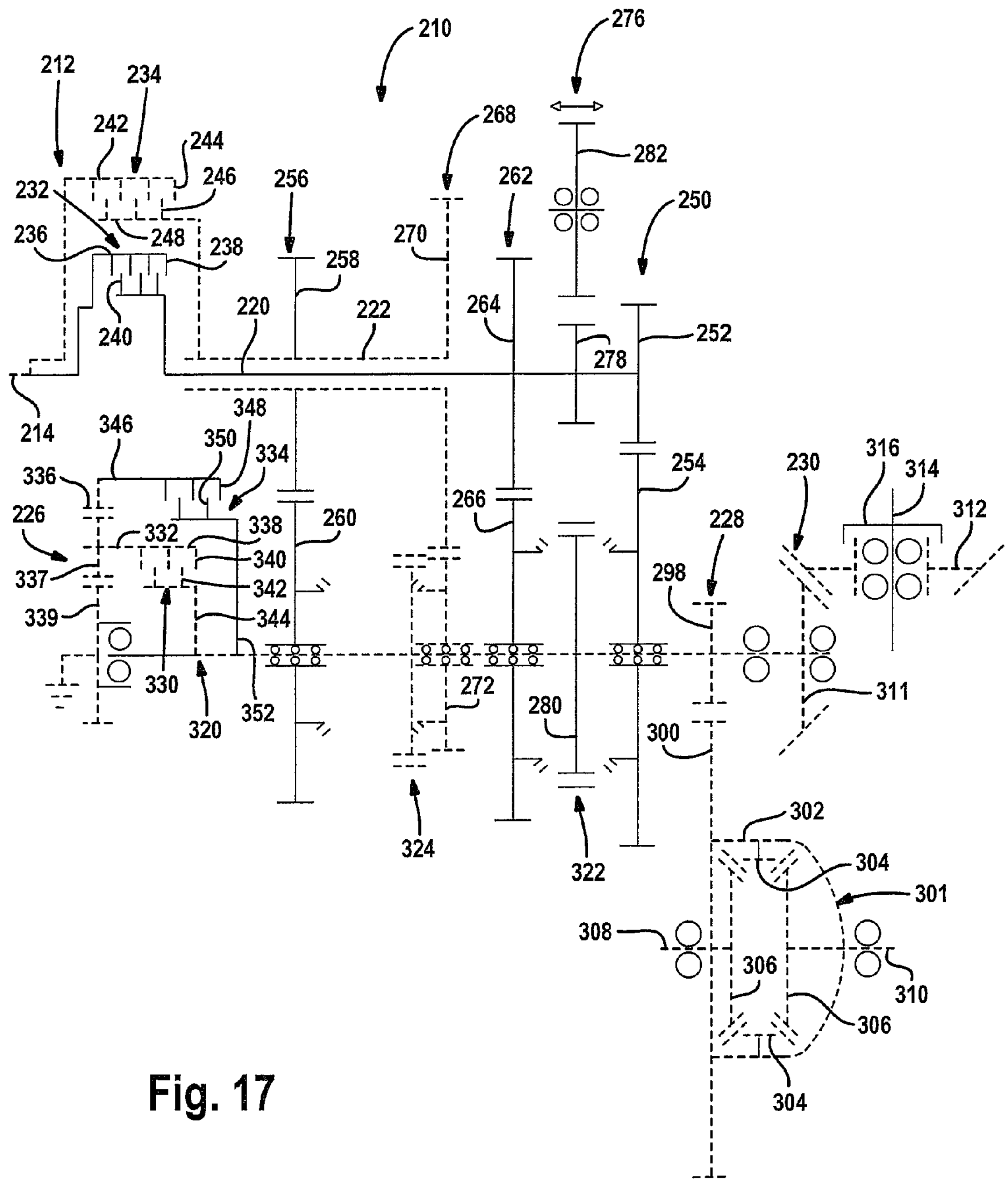
FIG. 17 is a schematic depicting a power flow when the transaxle of FIG. 10 provides an eighth forward drive ratio.

FIG. 13 depicts the flow of power through transaxle 210 during provision of a fourth forward drive ratio. The sequential 3-4 up-shift is performed in substantially the same manner as the 1-2 up-shift previously described. In particular, first synchronizer clutch 322 is indexed to the right, second synchronizer clutch 324 is indexed to the left while third clutch 330 and fourth clutch 334 remain in the same actuation modes as during the third forward drive ratio to provide a direct drive 1:1 ratio from planetary gearset 226. The 3-4 up-shift is accomplished by simultaneously deactuating first clutch 232 and actuating second clutch 234.

The fifth through eighth forward drive ratios are provided in substantially the same manner as previously described. FIGS. 14-17 depict the relative positions of first synchronizer clutch 322, second synchronizer clutch 324 as well as the actuation modes of first clutch 232, second clutch 234, third clutch 330 and fourth clutch 334 to provide the fifth through eighth forward drive ratios.

Figure 18:
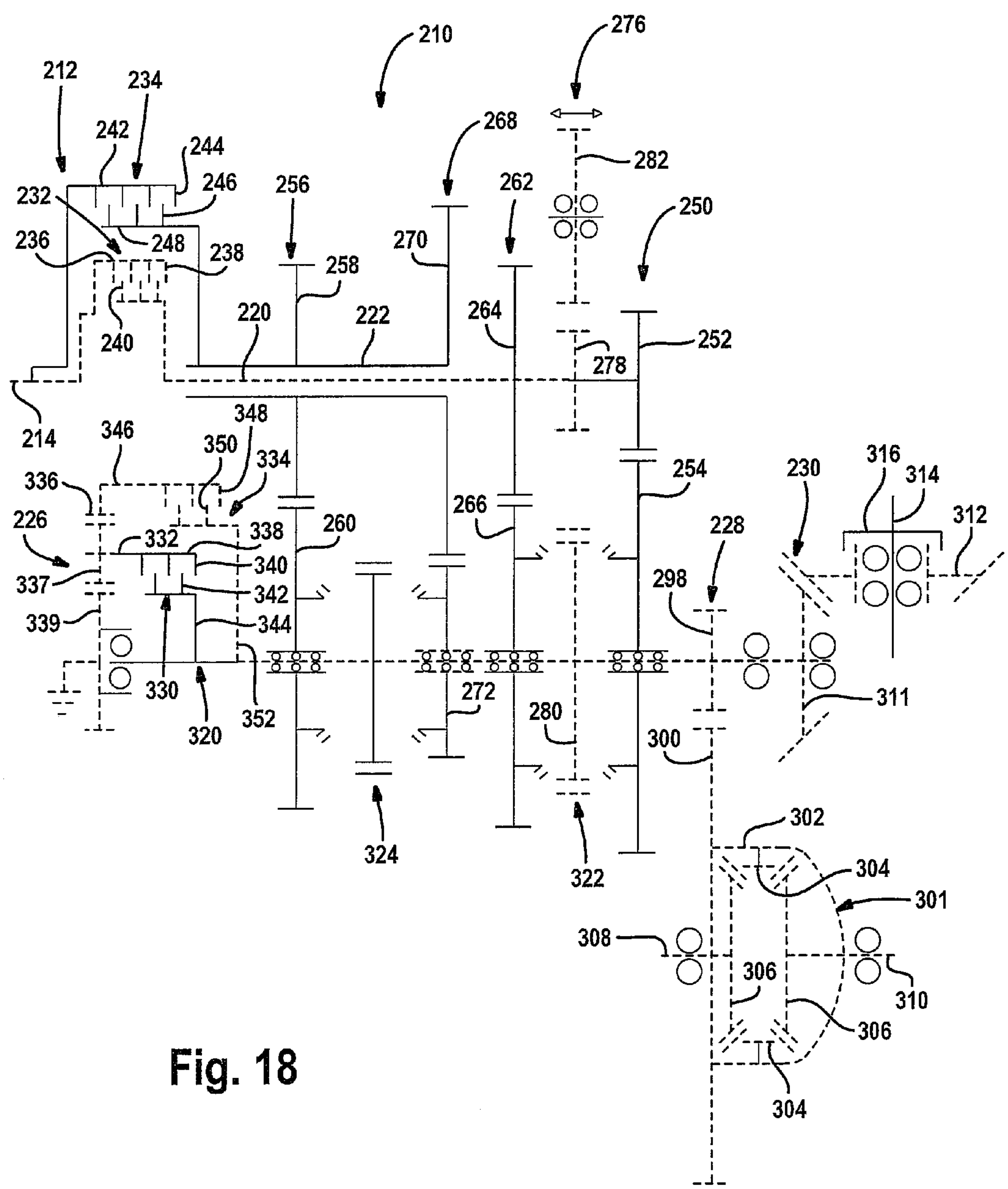
FIG. 18 is a schematic depicting a power flow when the transaxle of FIG. 10 provides a reverse gear ratio.

FIG. 18 shows that the reverse drive ratio is obtained by axially moving reverse idler gear 282 into meshed engagement with reverse drive gear 278 and reverse driven gear 280. First clutch 232 is actuated, second clutch 234 is deactuated, third clutch 330 is deactuated and fourth clutch 334 is actuated to provide torque to axle shafts 308 and 310 in a reverse drive ratio. It should be appreciated that clutch 316 may be actuated to transfer torque to another axle or set of driven axles during any one of the forward or reverse drive ratios.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transaxle for transferring torque to first and second axle shafts, comprising:

a main shaft;

a planetary gearset;

a first clutch operable to transfer torque between the main shaft and a first member of the planetary gearset;

a second clutch operable to transfer torque between the main shaft and a second member of the planetary gearset;

an input shaft fixed for rotation with the first member of the planetary gearset;

a countershaft;

first, second, third and fourth speed gearsets disposed between the input shaft and the countershaft; and a final drive unit driven by the countershaft and including a differential assembly adapted to drive the first and second axle shafts, wherein actuation of the first and second clutches selectively provides first through eighth discrete forward drive ratios such that each of the first, second, third and fourth speed gearsets transfers torque during provision of two of the first through eighth forward drive ratios.

2. The transaxle of claim 1 wherein the first speed gearset includes a first drive gear driven by the input shaft and a first driven gear rotatably supported by the countershaft, and wherein the second speed gearset includes a second drive gear driven by the input shaft and a second driven gear rotatably supported by the countershaft.

3. The transaxle of claim 2 further including a first synchronizer clutch to selectively drivingly connect one of the first driven gear and the second driven gear to the countershaft.

4. The transaxle of claim 3 further including a second synchronizer clutch to selectively drivingly connect one of the third speed gearset and the fourth speed gearset to the countershaft.

5. The transaxle of claim 1 wherein the first clutch is at least partially enveloped by the second clutch.

6. The transaxle of claim 1 wherein the first clutch and second clutch are at least partially engaged at the same time during a gear shift.

7. The transaxle of claim 1 wherein the first member of the planetary gearset is a carrier, wherein the second member of the planetary is a ring gear, wherein the planetary gearset further includes a non-rotary sun gear and pinion gears supported from the carrier in meshed engagement with the ring gear and the sun gear.

8. The transaxle of claim 1 further including a power take-off unit driven by the countershaft and adapted to provide torque to another axle shaft.

9. A transaxle comprising:

a main shaft;

a first input shaft;

a second input shaft;

a first clutch operable to drivingly couple the main shaft and the first input shaft;

a second clutch operable to drivingly couple the main shaft and the second input shaft;

a countershaft;

first and third drive gears driven by the first input shaft;

second and fourth drive gears driven by the second input shaft;

first, second, third and fourth driven gears supported on the countershaft, wherein the first, second, third and fourth drive gears being in meshed engagement with the corresponding first, second, third and fourth driven gears;

a planetary gearset;

a third clutch operable to couple a first member of the planetary gearset to the countershaft; and a fourth clutch operable to couple a second member of the planetary gearset to the countershaft, wherein eight distinct forward drive ratios are provided between the main shaft and the countershaft.

10. The transaxle of claim 9 wherein the second input shaft concentrically surrounds at least a portion of the first input shaft.

11. The transaxle of claim 9 wherein the second clutch at least partially envelops the first clutch.

12. The transaxle of claim 9 wherein the fourth clutch at least partially envelops the third clutch.

13. The transaxle of claim 9 wherein the first member of the planetary gearset is a carrier rotatably supporting pinion gears, wherein the second wherein the planetary gearset includes a sun gear restricted from rotation with the planet gears meshed with the ring gear and the sun gear.

14. The transaxle of claim 9 further including a final drive unit driven by the countershaft and driving a differential adapted to drive first and second axle shafts, the transaxle further including a power take-off unit driven by the countershaft and adapted to provide torque to another axle shaft.

* * * * *